(12) United States Patent
McEntee et al.

(10) Patent No.: US 8,776,782 B2
(45) Date of Patent: Jul. 15, 2014

(54) SOLAR COLLECTOR

(75) Inventors: Paul Thomas McEntee, Belfast (GB); Richard Pelan, County Down (GB); Stuart McSheehy, Beckenham Kent (GB); Patrick Robert Davis, County Down (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 24 days.

(21) Appl. No.: 13/266,174

(22) PCT Filed: Apr. 27, 2010

(86) PCT No.: PCT/IE2010/000030
§ 371 (c)(1),
(2), (4) Date: Oct. 25, 2011

(87) PCT Pub. No.: WO2010/125549
PCT Pub. Date: Nov. 4, 2010

(65) Prior Publication Data
US 2012/0042872 A1    Feb. 23, 2012

(30) Foreign Application Priority Data
Apr. 27, 2009  (IE) .................................... 2009/0335

(51) Int. Cl.
*F24J 2/05* (2006.01)
*F24J 2/24* (2006.01)
*F16L 3/08* (2006.01)

(52) U.S. Cl.
USPC ............................ 126/659; 126/652; 126/658

(58) Field of Classification Search
CPC ............. F16L 3/04; F16L 3/02; F16L 3/1233; F16L 3/1008; F16L 41/001; F24D 3/141; F16B 2/248; F24J 2002/5275; F24J 2/26; F24J 2/5256; F24J 2/055
USPC ........................... 126/652, 658, 659; 248/74.2
See application file for complete search history.

(56) References Cited

U.S. PATENT DOCUMENTS 396,677 A * 1/1889 Zimmerman .................... 248/71
1,398,519 A * 11/1921 Hosch ......................... 248/316.7
(Continued)

FOREIGN PATENT DOCUMENTS

DE    26 40 060        3/1978
DE    199919835 A1 *  11/2000
(Continued)

OTHER PUBLICATIONS

DE 19919835 A1 (Haas Gotfried et al) Nov. 9, 2000 (description machine translation) Espacenet Patent Search [>database< online]. European Patent Office [retrieved on Jul. 13, 2013].*

*Primary Examiner* — Kenneth Rinehart
*Assistant Examiner* — Sharla Magana
(74) *Attorney, Agent, or Firm* — Jacobson Holman, PLLC.

(57) ABSTRACT

A solar collector comprises an evacuated glass tube (8), an absorbing section (9) comprising a radiation absorbing plate (10), an elongate tube (11, 15) for a working fluid in contact with the radiation absorbing plate (10) and a wire clip (25) for retaining the absorbing section (9) in position in the solar absorbing glass tube (8). The wire clip (25) consists of a single piece wire having a clamping portion (26) for clamping onto the outer surface of the working fluid tube (11, 15) and a pair of resilient side support sections (27) flanking the clamping portion (26). The side support sections (27) extend so that portions thereof engage against the inner surface of the solar absorbing tube (8).

12 Claims, 17 Drawing Sheets

(56) References Cited

U.S. PATENT DOCUMENTS

| | | | | |
|---|---|---|---|---|
| 3,444,596 A | * | 5/1969 | Edmund | 248/73 |
| 3,583,663 A | * | 6/1971 | Snow, Jr. | 248/71 |
| 4,120,284 A | * | 10/1978 | Cotsworth et al. | 126/659 |
| 4,133,298 A | * | 1/1979 | Hayama | 126/591 |
| 4,164,935 A | * | 8/1979 | Marles et al. | 126/659 |
| 4,440,154 A | * | 4/1984 | Bellows | 126/694 |
| 4,523,578 A | * | 6/1985 | Mahdjuri Sabet | 126/677 |
| 4,653,471 A | * | 3/1987 | Takeuchi et al. | 126/635 |
| 4,911,145 A | * | 3/1990 | Ohashi | 126/584 |
| 4,958,792 A | * | 9/1990 | Rinderer | 248/74.2 |
| 5,316,247 A | * | 5/1994 | Wodka | 248/73 |
| 5,477,848 A | * | 12/1995 | Reed | 126/659 |
| 5,572,987 A | * | 11/1996 | Moratalla et al. | 126/652 |
| 5,677,513 A | * | 10/1997 | Ito et al. | 174/72 A |
| 6,009,906 A | * | 1/2000 | Salazar | 138/28 |
| 6,354,543 B1 | * | 3/2002 | Paske | 248/68.1 |
| 6,604,549 B2 | * | 8/2003 | Gauthier et al. | 138/108 |
| 6,648,278 B1 | * | 11/2003 | Kirschner | 248/62 |
| D578,383 S | * | 10/2008 | Adams | D8/395 |
| 8,083,188 B2 | * | 12/2011 | Kittle et al. | 248/74.2 |
| 2002/0130237 A1 | * | 9/2002 | Kluser | 248/316.1 |
| 2005/0048640 A1 | * | 3/2005 | Kennedy et al. | 435/283.1 |
| 2006/0108480 A1 | * | 5/2006 | Goodwin et al. | 248/63 |

FOREIGN PATENT DOCUMENTS

| | | | |
|---|---|---|---|
| EP | 1528335 | | 5/2005 |
| GB | 2 449 766 | | 12/2008 |
| JP | 5710859 | A * | 7/1982 |
| JP | 57-198956 | | 12/1982 |
| JP | 58-153050 | | 9/1983 |
| JP | 59-060150 | | 4/1984 |
| JP | 62-175555 | | 8/1987 |

* cited by examiner

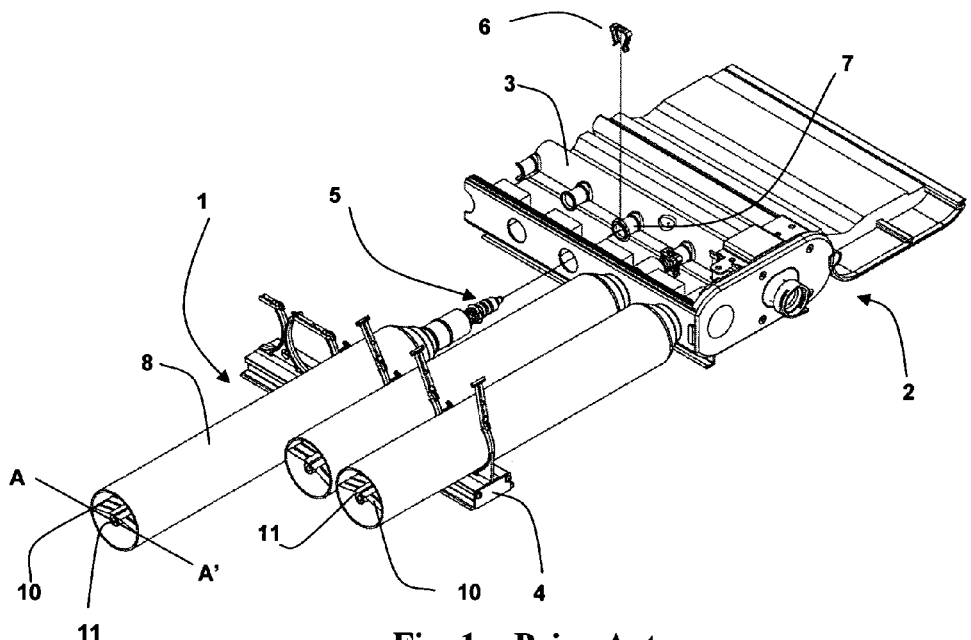
Fig. 1 – Prior Art
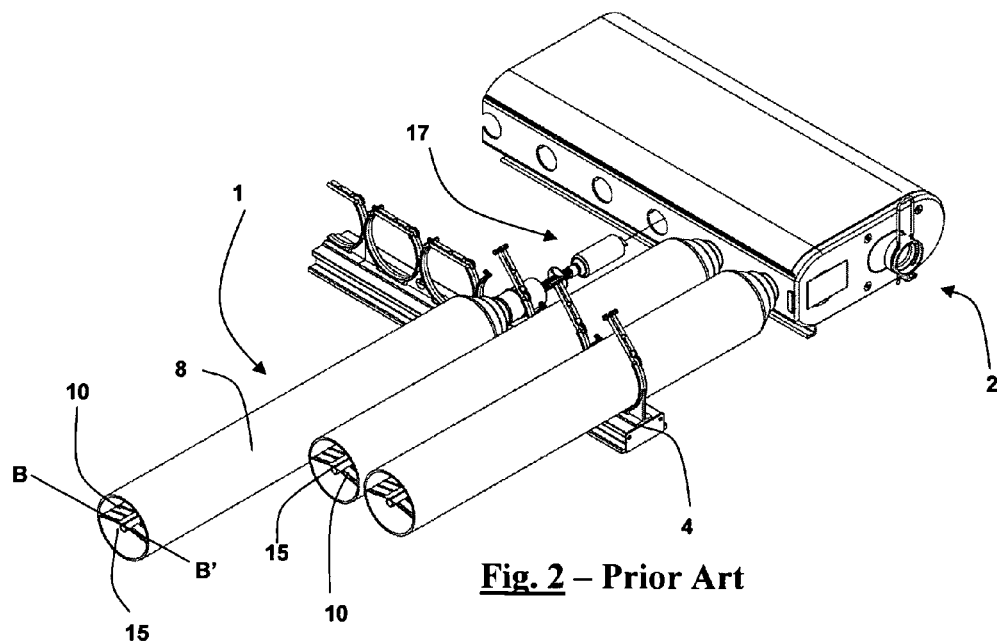
Fig. 2 – Prior Art

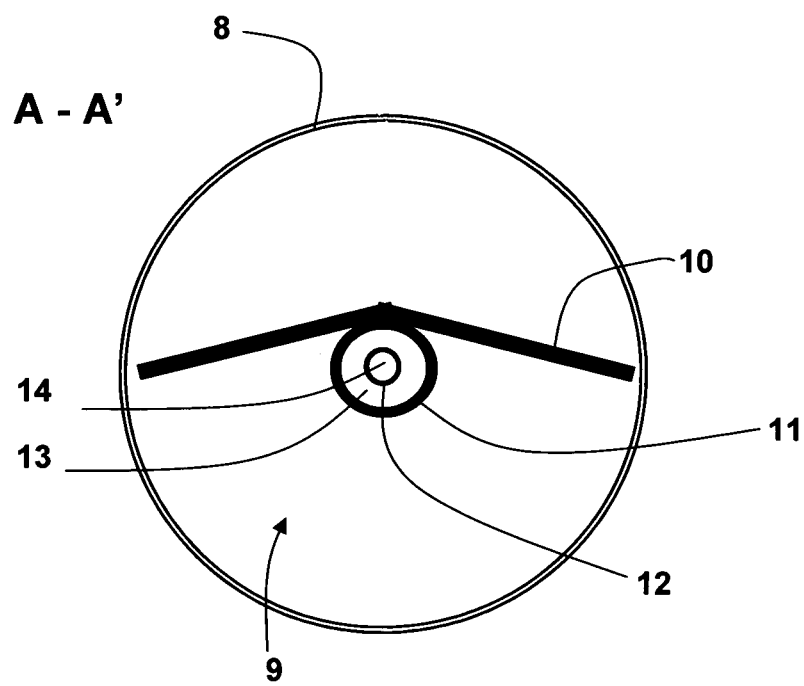
Fig. 3 – Prior Art
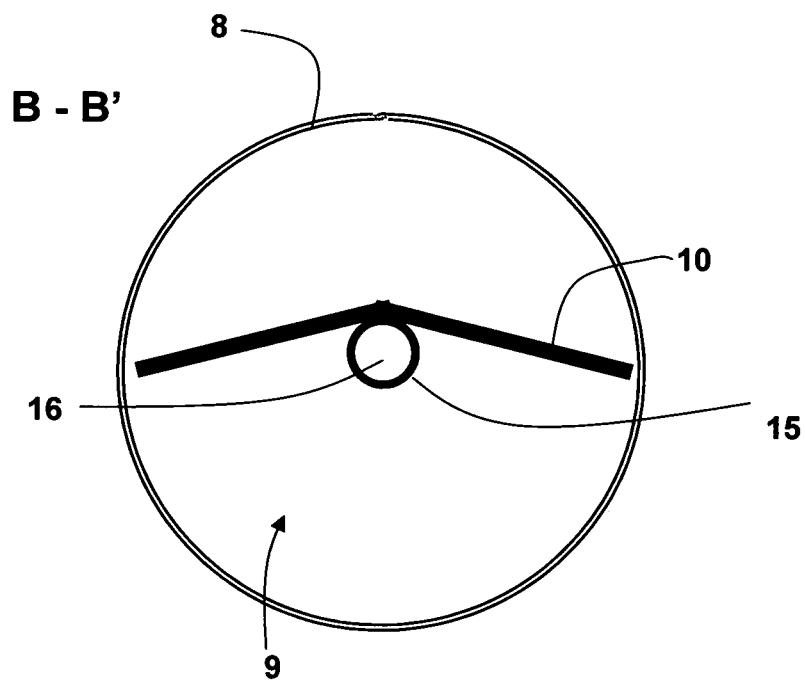
Fig. 4 – Prior Art

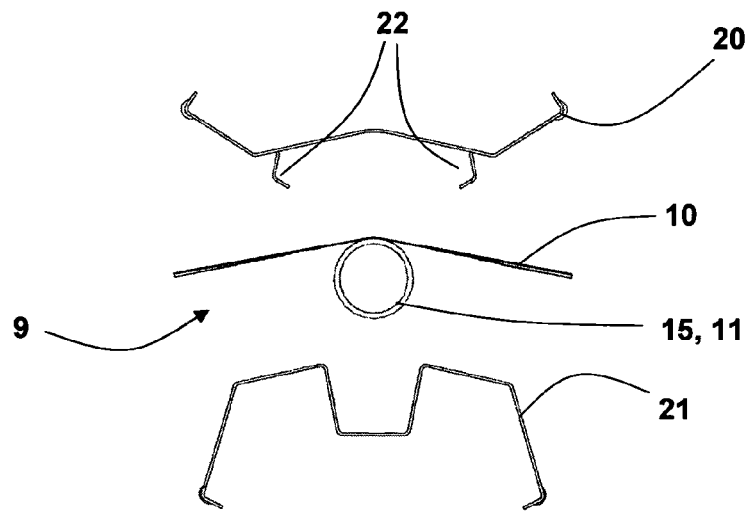
Fig. 5 – Prior Art
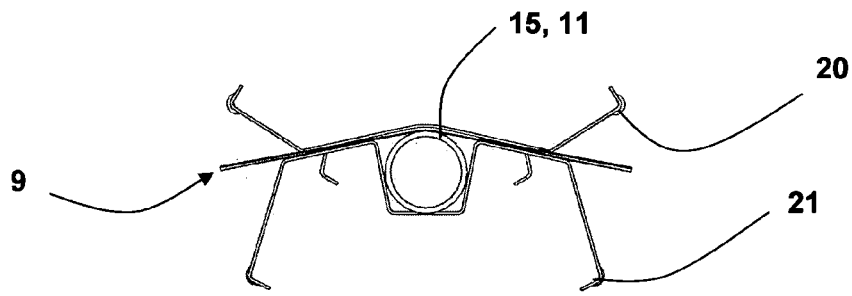
Fig. 6 – Prior Art
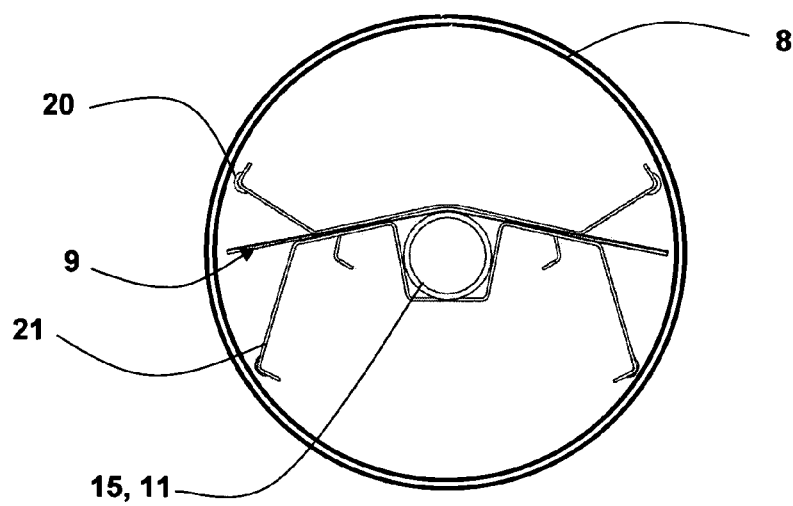
Fig. 7 – Prior Art

SOLAR COLLECTOR

This is a national stage of PCT/IE10/000030 filed Apr. 27, 2010 and published in English, which claims the priority of Ireland number 2009/0335 filed Apr. 27, 2009, hereby incorporated by reference.

The present invention relates to a solar collector for converting solar radiation into heat and to transfer the latter with the maximum possible efficiency to a fluid heat transferring means (e.g. water or air) whereby the heat can be utilised in a domestic or industrial application, for example to heat a domestic hot water or central heating system.

A solar collector typically comprises a number of elongate tubes containing a radiation absorbing plate for absorbing solar radiation in contact with a pipe through which the fluid to be heated can be passed or within which is contained a working fluid for transferring heat to the fluid to be heated. The radiation absorbing plate and at least a portion of the pipe are enclosed within an evacuated radiation transparent enclosure to prevent heat loss.

The radiation absorbing plate is maintained in a central position within the evacuated radiation transparent enclosure using supporting/retaining structures. Prior art collectors are known to use supporting structures that are manufactured from a plate material that is typically punched and formed from stainless steel. The supporting plates of the known art are generally a two-piece support plate, forming an upper clip and a lower plate, that engage on the absorbing plate to maintain the absorbing plate in a central position. Similarly, a single piece support plate is also known from the prior art that is attached to only one side of the absorbing plate to maintain the absorbing plate in a central position within the evacuated radiation transparent enclosure.

There is a need for an improved support system for an absorber plate.

STATEMENTS OF INVENTION

According to the invention there is provided a solar collector comprising an evacuated radiation transparent solar absorbing tube, an absorbing section comprising a radiation absorbing means, an elongate tube for a working fluid in contact with the radiation absorbing means and a retaining means for retaining the absorbing means in position in the solar absorbing tube, wherein the retaining means comprises a single piece wire clip having a clamping portion extending partially around and clamping onto the outer surface of the working fluid tube and a pair of resilient side support sections flanking the clamping portion, the side support sections extending so that portions thereof engage against the inner surface of the solar absorbing tube.

The single piece wire clip lies in a single plane transverse to the longitudinal axis of the solar absorbing tube. The single piece wire clip is symmetrical about an axis through the centre of the working fluid tube.

In one embodiment the side support sections each terminate in a free end portion. The free end portions may be in-turned.

In one embodiment the inner clamping portion is of generally arcuate form extending partially around the working fluid tube, the radius of the arc being approximately equal to (or slightly less than) the outer radius of the working fluid tube.

In one case the inner clamping portion comprises an open mouth for engagement with the outer surface of the working fluid tube. Preferably the width of the mouth is less than the outer diameter of the working fluid tube.

The side support sections may be of generally arcuate form.

The wire form may be of generally circular cross section.

In one embodiment the absorber means comprises an absorber plate having side openings through which the side support sections of the clip extend without contacting the absorber plate.

In one case the clip comprises connecting sections between the clamping portion and the side support sections.

The absorber plate may comprise openings through which the connecting portions extend to support the absorber plate. The connector portions preferably engage with the absorber plate.

The invention also provides a retainer for an absorber plate of a solar collector comprising a single piece wire clip having a clamping portion for extending partially around and clamping onto an outer surface of a working fluid tube and a pair of resilient side support sections flanking the clamping portion. The clip is preferably substantially flat. The clip is preferably symmetrical.

In one embodiment the side support sections each terminate in a free end portion. Preferably the free end portions are in-turned.

In one embodiment the inner clamping portion is of generally arcuate form. Preferably the clamping portion comprises an open mouth for engagement with the outer surface of a pipe.

Preferably the side support sections are of generally arcuate form.

In one case the wire form is of generally circular cross section.

In one embodiment wherein the absorber means comprises an absorber plate having side openings through which the side support sections of the clip extend without contacting the absorber plate.

Preferably the clip comprises connecting sections between the clamping portion and the side support sections.

The absorber plate preferably comprises openings through which the connecting portions extend to support the absorber plate.

There are several benefits in using a single piece wire-formed retainer/support clips, including a lower cost of manufacture and due to the circular nature of the wire they are less likely to generate scratch marks on the internal surfaces of the radiation transparent enclosure during insertion of the absorbing plate into the radiation transparent enclosure. In addition, wire-formed clips do not cover areas of the absorbing plate, thereby leaving open a greater area of the absorbing plate for solar absorption and thereby increasing the operating efficiency of the collector.

This invention removes both the need to rivet the wire-formed support clip to the absorbing plate, addresses the aesthetic issues by preferentially placing the clip onto the rear of the absorbing plate, and provides a simple wire-form clip the insertion of which can be readily automated.

BRIEF DESCRIPTION OF THE DRAWINGS

The invention will be more clearly understood from the following description, given by way of example only, with reference to the accompanying drawings, in which:

FIG. 1 is a perspective sectional view of a prior art tubular solar collector of the direct flow type;

FIG. 2 is a perspective sectional view of a prior art tubular solar collector of the heat-pipe type;

FIG. 3 is a cross-section on the line A-A' of FIG. 1 of a solar collector tube of the direct flow type;

FIG. 4 is a cross-section on the line B-B' of FIG. 2 of a solar collector tube of the heat-pipe type;

FIG. 5 is an exploded planar view of a prior art two-sided support plates prior to attachment to the absorbing plate assembly;

FIG. 6 is a planar view of a prior art two-sided support plates after attachment of the support plates to the absorbing plate assembly;

FIG. 7 is a planar view of the assembled prior art support plates and radiation absorbing section inserted into the transparent radiation enclosure;

DETAILED DESCRIPTION

Figure 8:
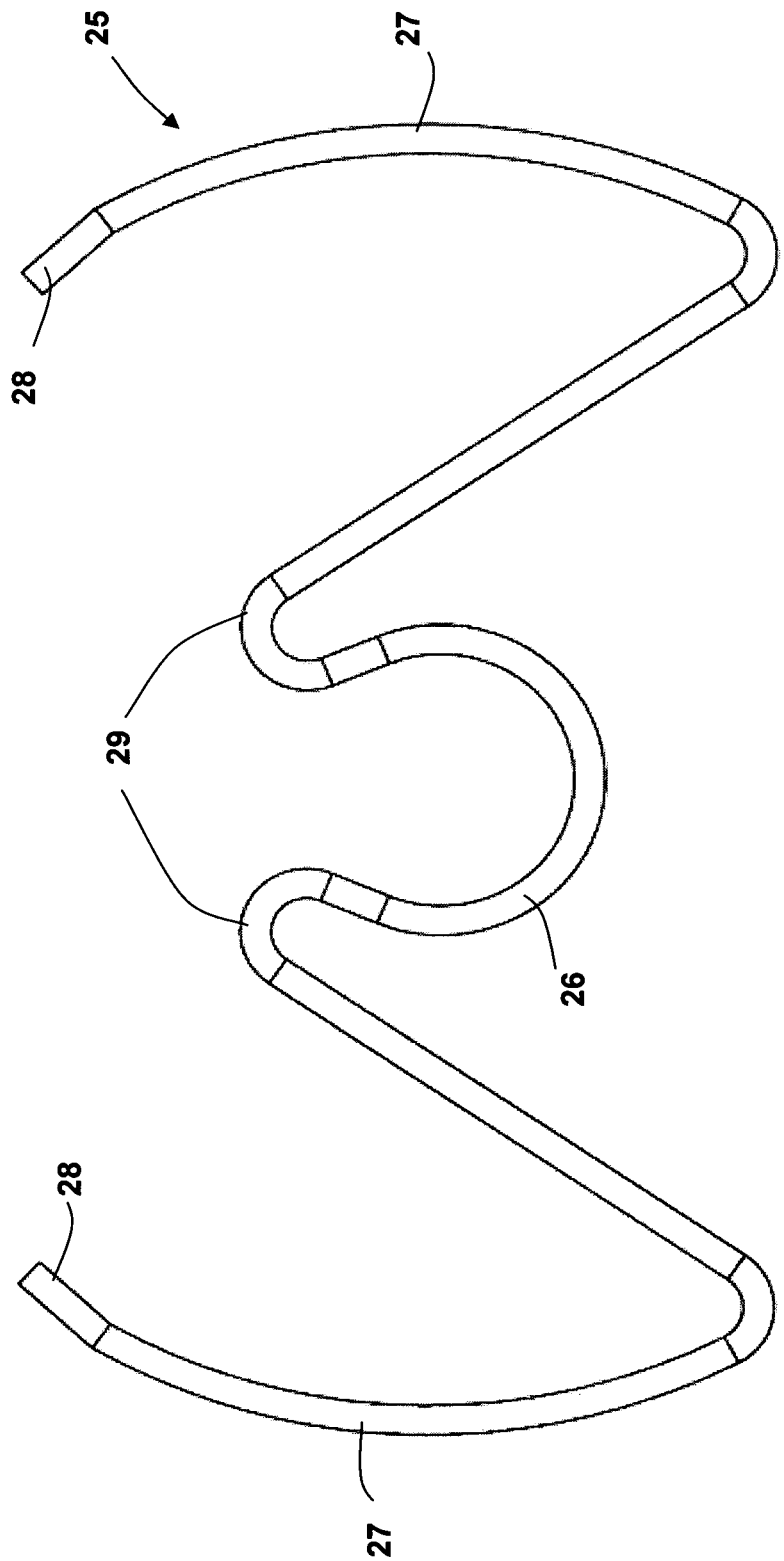
FIG. 8 is a planar view of the one piece wire-form retainer/support clip according to the invention.

As illustrated in FIG. 1 to FIG. 4 a solar collector assembly comprises a solar absorbing tube 1 comprising an evacuated radiation transparent enclosure 8 enclosing an absorbing section 9, comprising a radiation absorbing plate 10 for absorbing solar radiation and an elongate tube 11, 15 containing a working fluid (heat transfer medium), in thermal contact with said radiation absorbing plate 10. In one type of collector known as the direct flow type, and shown in FIG. 1 and FIG. 3, the elongate tube 11 contains a concentrically positioned inner pipe 12 thereby forming two concentric internal flow passage ways 13, 14 for the flow of a fluid to be heated. The elongate tube 11 extends out of one end of the solar absorbing tube 1 and into an end fitting 5 wherein an annular outer passageway 13 of the elongate tube 11 communicates with a cold fluid inlet stream within a manifold chamber 3 of a manifold 2 and the inner passageway 14 of the elongate tube 11 communicates with a hot fluid outlet stream within the manifold chamber 3, the fluid passing from the annular outer passageway 13 to the inner passageway 14 via a flow path provided at a distal end of the elongate tube 11.

The end fitting 5 is inserted into a manifold flange 7 in order to facilitate the communication of the annular outer passageway 13 and the inner passageway 14 with the cold fluid inlet stream and the hot fluid outlet stream respectively, within the manifold chamber 3 of a manifold 2. A resilient clip 6 is used to secure the tube into its fitted position and to maintain the tube in its fitted position under operational conditions.

In an alternative type of collector, known as the heat-pipe type, and shown in FIG. 2 and FIG. 4 radiation absorbing surface 10 of each absorbing section 9 is in thermal contact with an evaporator section of a heat pipe comprising an elongate tube 15 containing a heat transfer medium in a fluid chamber 16. A second section of said elongate tube, defining a condenser section 17 of the heat pipe, being in thermal contact with a fluid chamber 16 defined within said elongate member, preferably within said end fitting, and communicating with said fluid connection means to enable heat transfer between said fluid to be heated and said heat transfer medium.

In both embodiments of prior art solar collectors, the direct flow type as shown in FIG. 1 and FIG. 3 and the heat-pipe type as shown in FIG. 2 and FIG. 4, the radiation absorbing section 9 is located centrally within the radiation transparent enclosure 8. FIG. 5 to FIG. 7 show a prior art method for locating the absorbing section 9 centrally within the radiation transparent enclosure 8. The radiation absorbing surface 10 and elongate tube 11, 15 are held centrally in position by an upper support plate 20, and a lower support plate 21, that positively engage with each other using fixing tags 22 in the upper support plate 20, that pass through occlusions in the absorber plate 10 and positively engage with occlusions in the lower support plate 21.

FIG. 6 shows a schematic of the upper support plate 20 and the lower support plate 21 assembled to the absorbing section 9. FIG. 7 shows the assembled position of the upper support plate 20 and the lower support plate 21 to the absorbing section 9 when located within the radiation transparent enclosure 8.

In other known prior art two wire-form structures are used in place of plate type structures that are riveted to the upper and lower faces of the absorbing section 9. The requirement to rivet the wire-form to the absorbing section 9 adds additional cost and complexity to the assembly process. In addition, the design of prior art wire-form support clips have been complex thereby rendering it complicated to facilitate their adoption in modern automated manufacturing machinery.

The invention described herein minimises the component cost by requiring only a single wire-form component without any riveting process and facilitates automated assembly by the adoption of a simple wire-form clip design and avoids scratching of the internal glass surfaces typically associated with prior art support structures.

Figure 9:
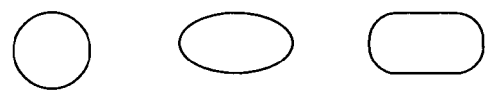
FIG. 9 are cross-sectional profiles of preferred embodiments of the wire-formed clip.

A supporting/retaining wire-form clip of a first embodiment of this invention is illustrated in FIG. 8. The supporting wire-form clip 25 is formed by shaping a straight piece of resilient wire into the required shape. The wire-form clip 25 is provided with a clamping section 26 that positively engages with the outer surface of the elongate tube 11, 15 in order to affix the supporting wire-form clip 25 to the elongate tube 11, 15. The wire-form clip 25 is provided with side sections 27 that engage against the inner walls of the radiation transparent enclosure 8 when the absorbing section 9 is inserted into the radiation transparent enclosure 8. There are arcuate transition/connecting sections 29 between the clamping section 26 and the side sections 27. The wire-form clip 25 is additionally provided with in-turned free edges 28 to minimise the opportunity for the wire-form clip to scratch the inner surfaces of the radiation transparent enclosure 8 during insertion. In addition, to facilitate insertion into the radiation transparent enclosure 8 the wire-form clip in a preferred embodiment is constructed from a wire with a circular cross-sectional profile. Alternative suitable profiles will be apparent to those skilled in the art, examples of which are, but not limited to, circular, oval and elliptical profiles, preferred embodiments of which are shown by way of example in FIG. 9.

Figure 10:
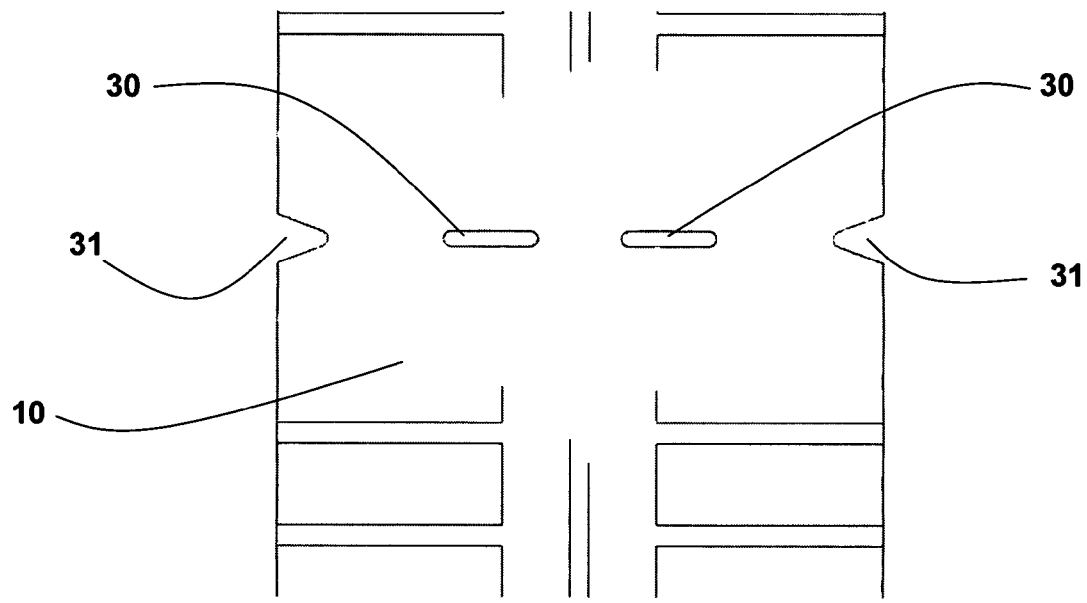
FIG. 10 is a planar view of the absorbing collector plate showing the occlusions made in the plate in order to accommodate the fitting of the wire-form clip to provide structural support in service and to provide a thermal gap at the extremities of the absorbing plate.
Figure 11:
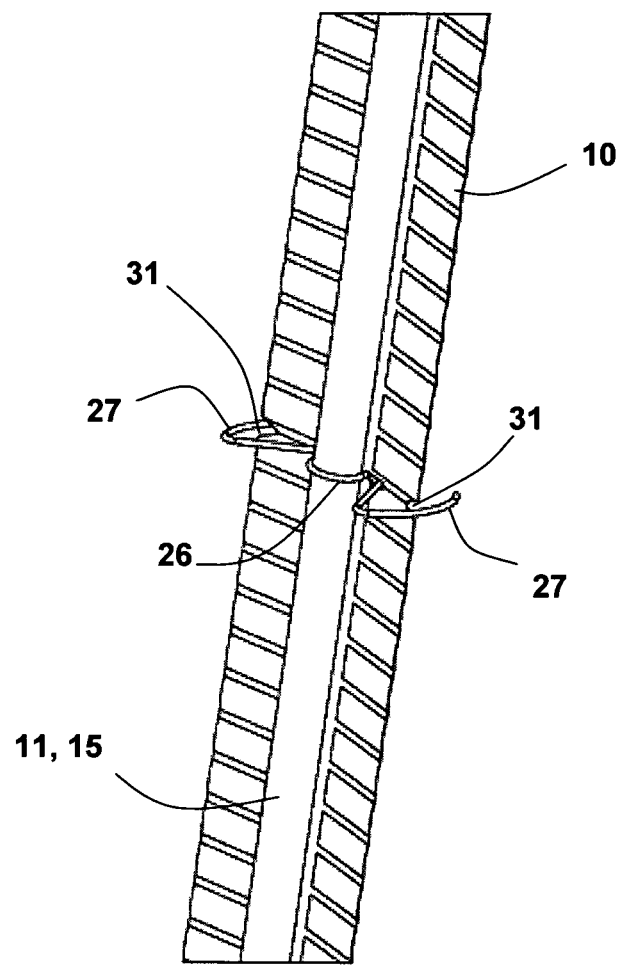
FIG. 11 is a perspective view of the under-side of the radiation absorbing plate with the single piece wire-form clip attached.

As shown in FIG. 10 the absorbing plate 10 is provided with one or more openings or occlusions. The absorbing plate 10 has one or more in this case two supporting occlusions 30 that are an interference engagement with the transition/connecting sections 29 of the wire-form clip 25 when assembled in order to provide support for the wire-form clip 25 in the longitudinal axis when it is installed in position, as shown in FIG. 11 to FIG. 14. In addition, as shown in FIG. 10 the absorbing plate 10 is provided with thermal occlusions 31 at the extremities of the absorbing plate 10 to allow the side sections 27 to pass therethrough. The occlusions 31 are sized to ensure that the wire-form clip 25 does not form a thermal bridge between the absorbing plate 10 and the transparent radiation enclosure 8.

Figure 12:
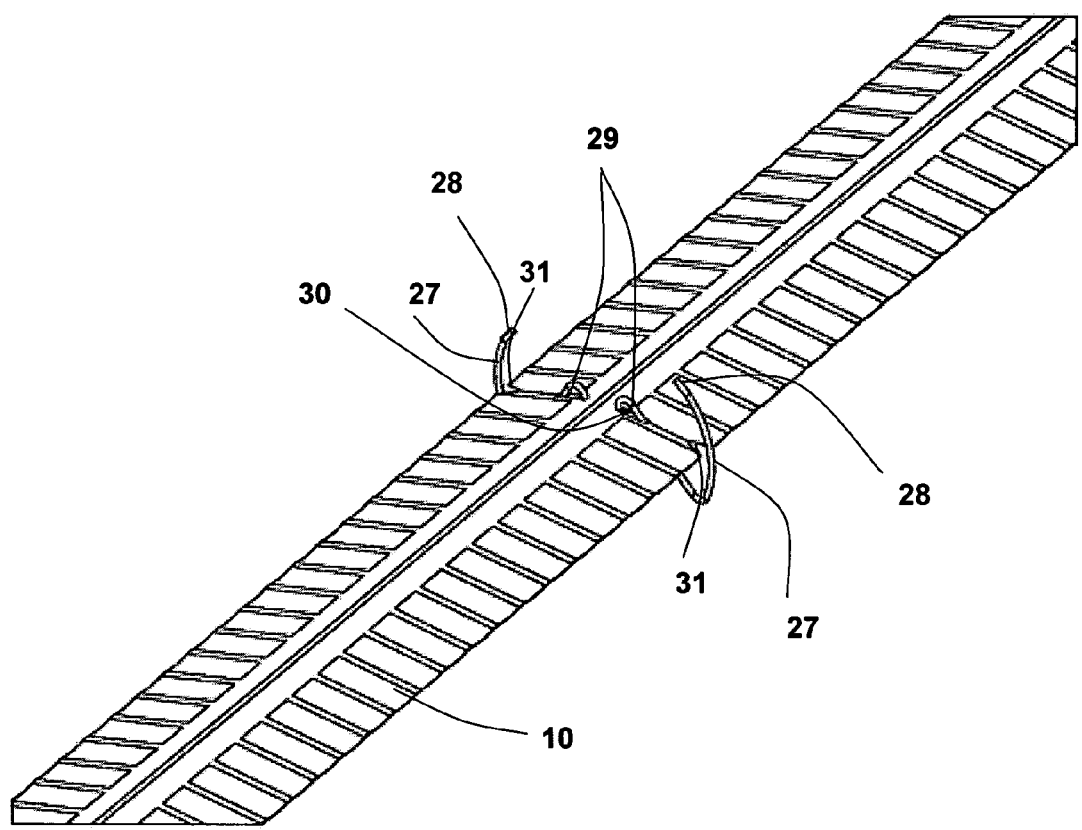
FIG. 12 is a perspective view of the upper-side of the radiation absorbing plate with the single piece wire-form clip attached.
Figure 13:
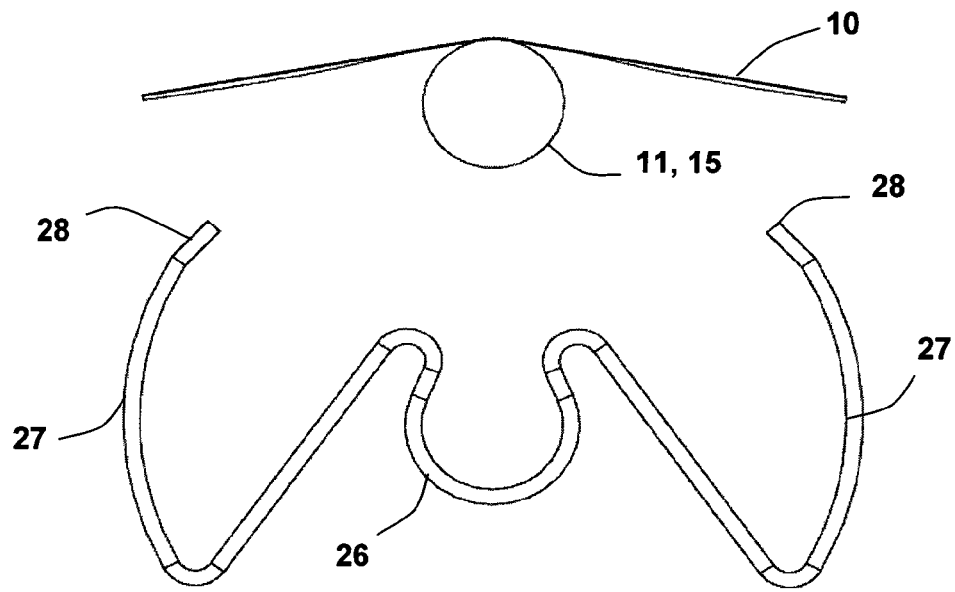
FIG. 13 is a perspective end-view of the absorber plate assembly and the wire-form clip prior to attachment.
Figure 14:
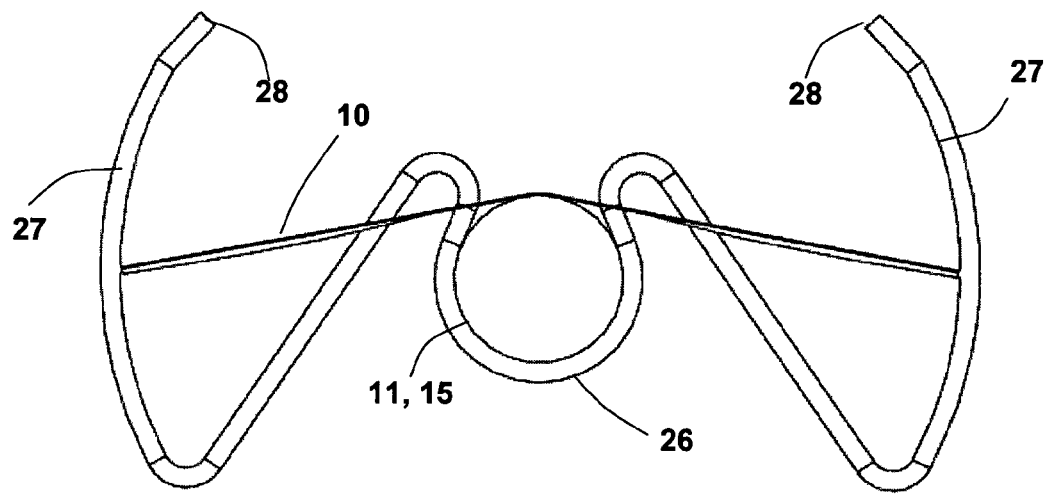
FIG. 14 is a planar end-view of the absorber plate assembly and the wire-form clip following attachment to the absorber plate assembly.
Figure 15:
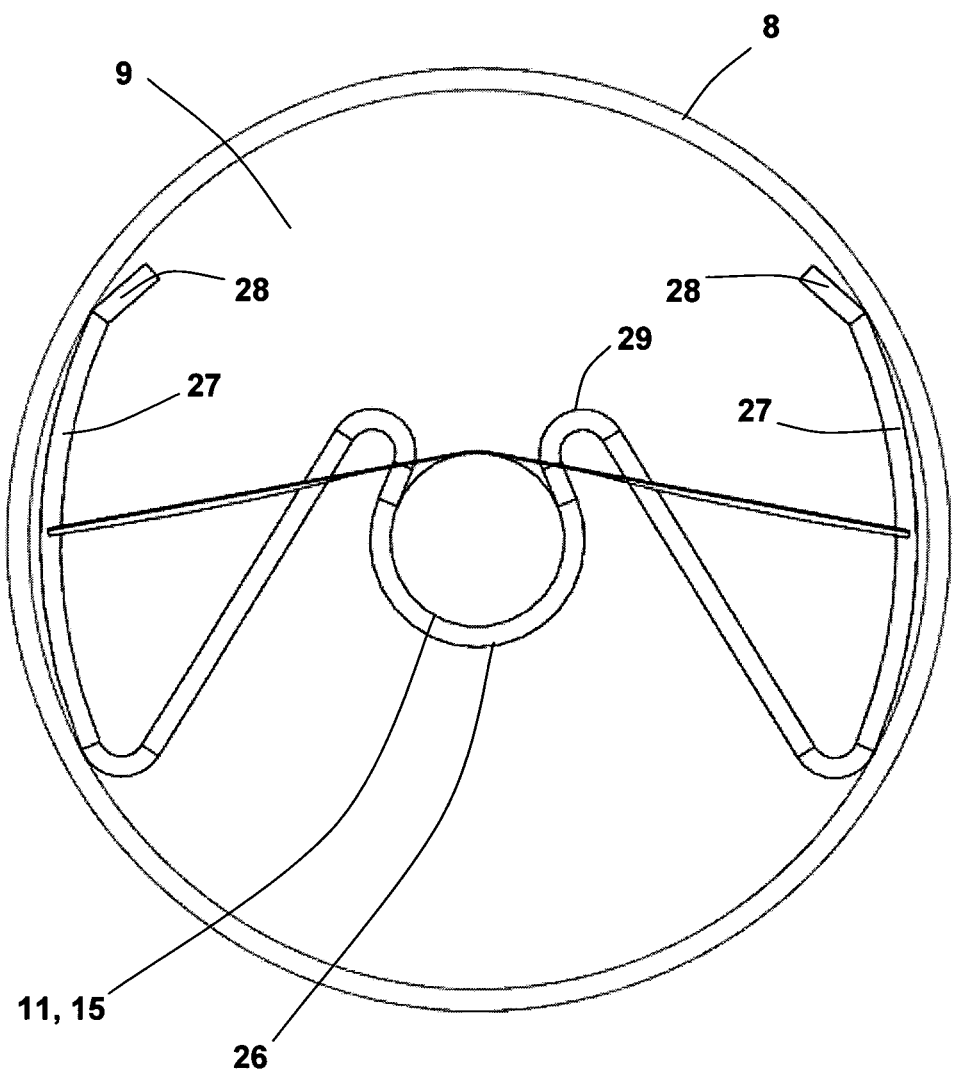
FIG. 15 is a planar end-view of the absorber plate assembly including the wire-form clip inserted into a radiation transparent tubular enclosure.

As shown in FIG. 11 to FIG. 15 the wire-form clip 25 positively engages with the elongate tube 11, 15 by the engagement of the clamping section 26 of the wire-form clip 25 onto the elongate tube 11, 15. Additional structural support is provided in the longitudinal axis by the transition/connecting sections (support lugs) 29 that protrude through one or more absorbing plate occlusions 30 that are provided in the absorbing plate 10 to allow the transition/connecting sections 29 of the wire-form clip 25 to protrude through the surface of the absorbing plate 10 as shown in FIG. 12, FIG. 14 and FIG. 15.

The thermal occlusions 31 are sized such that they will allow for a compression of the side support sections 27 of the wire-form clip 25 without coming into contact with the absorbing plate 10 and thereby forming a thermal bridge at this position between the absorbing plate 10, the side support sections 27 and the inner surface of the radiation transparent enclosure 8.

Figure 16:
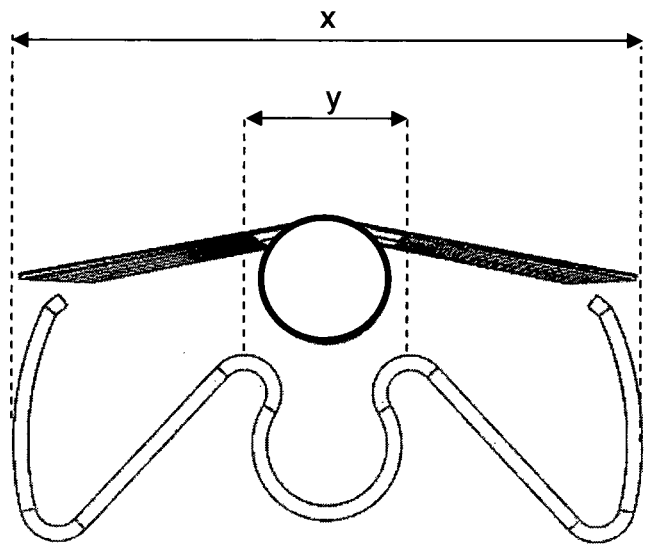
FIGS. 16 to 18 are the same views as FIGS. 13 to 15 with dimensional indicators added.
Figure 17:
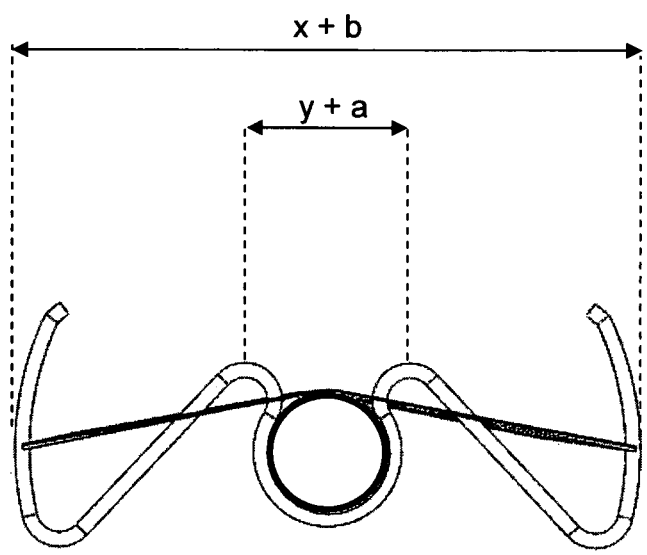
Figure 18:
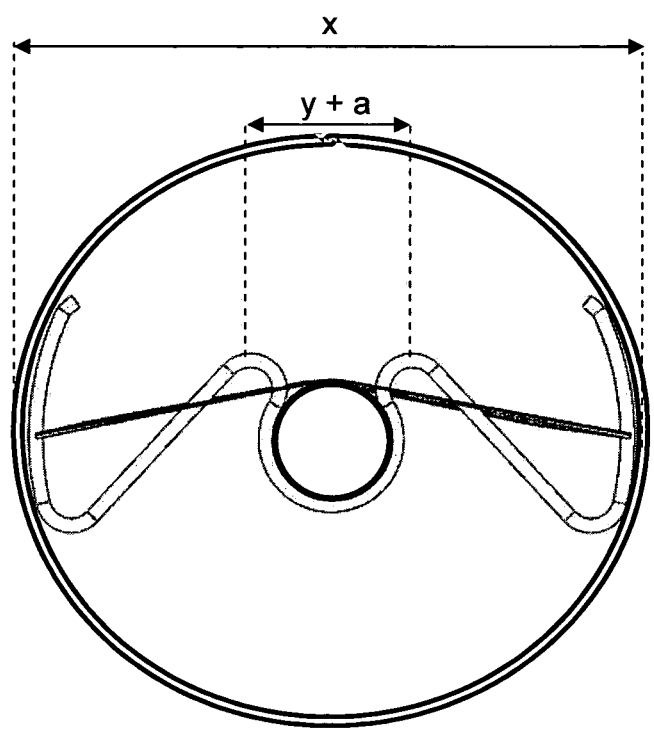
Figure 19:
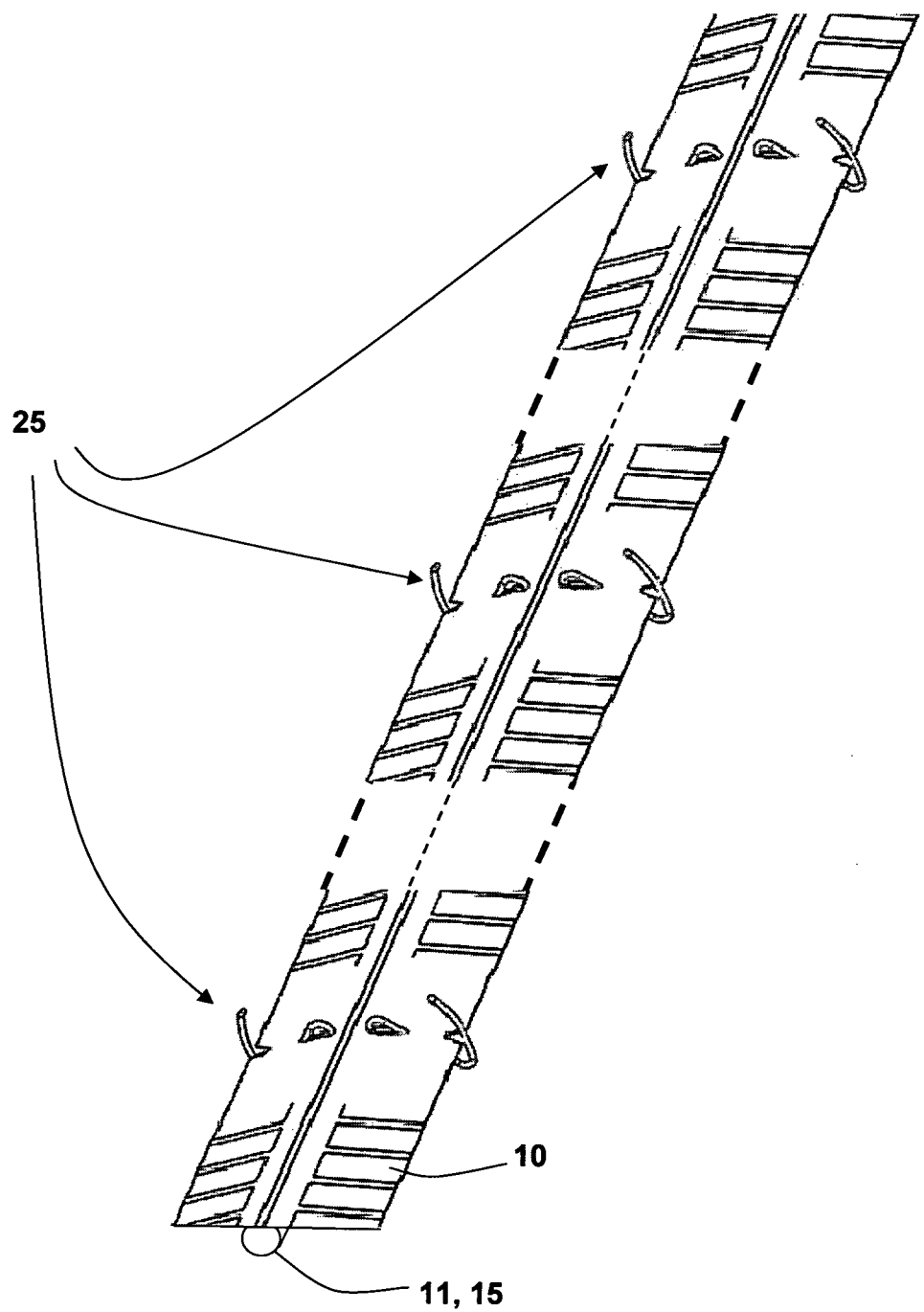
FIG. 19 is a perspective view of a preferred embodiment of the collector plate assembly with a plurality of one-piece wire-formed clips attached.
Figure 20:
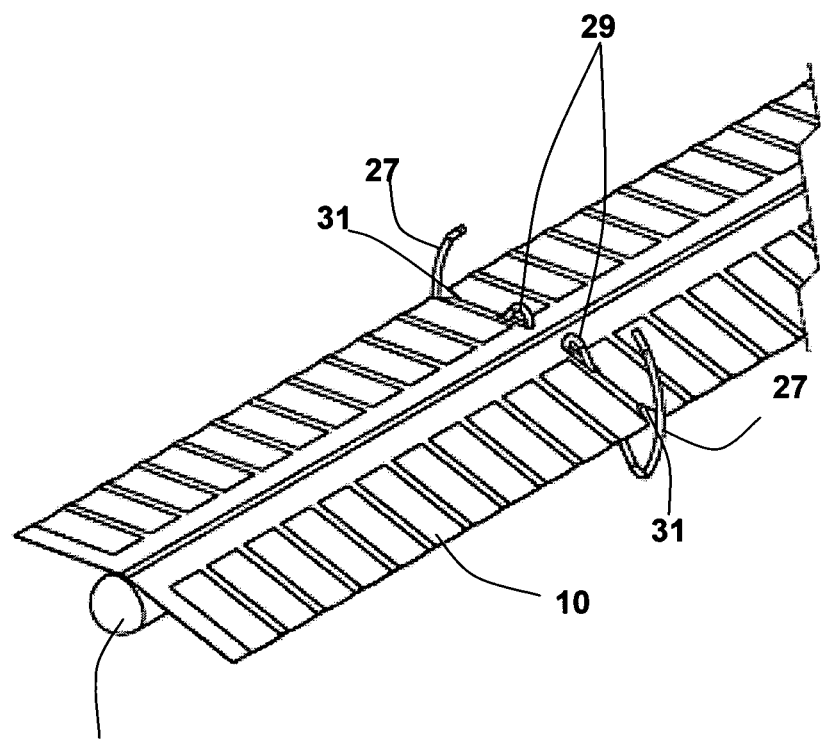
FIG. 20 is an isometric view of one end of the assembly of FIG. 19.
Figure 21:
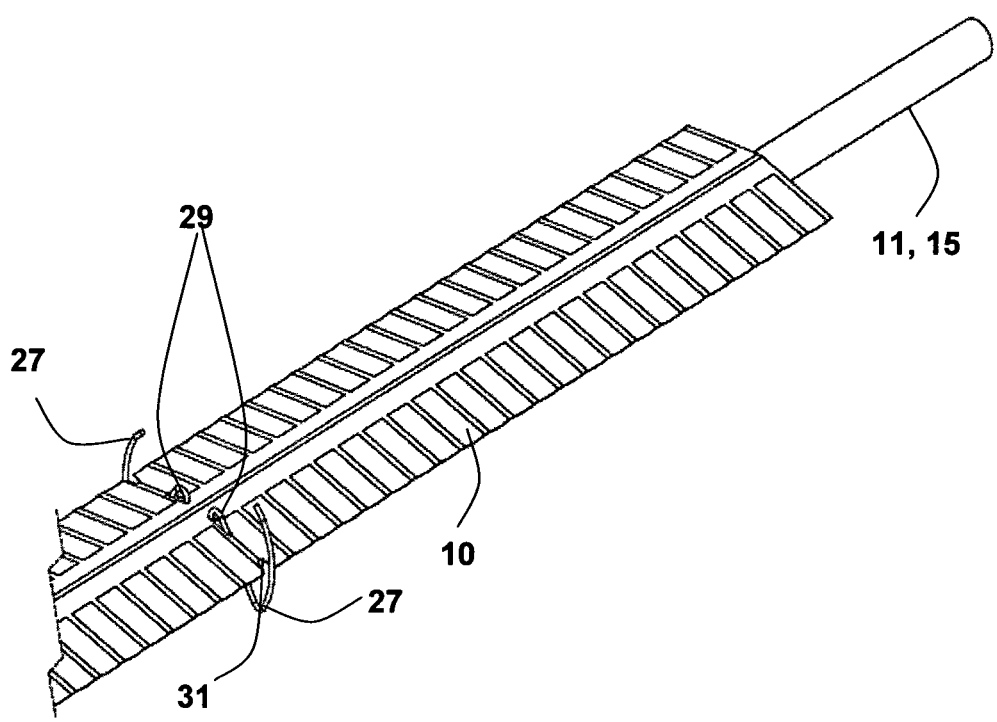
FIG. 21 is an isometric view of another end of the assembly of FIG. 19.
Figure 22:
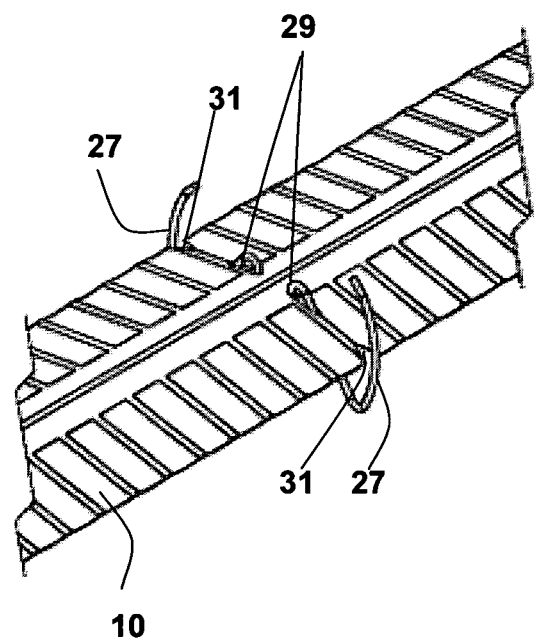
FIG. 22 is an isometric view of an intermediate part of the assembly of FIG. 19.
Figure 23:
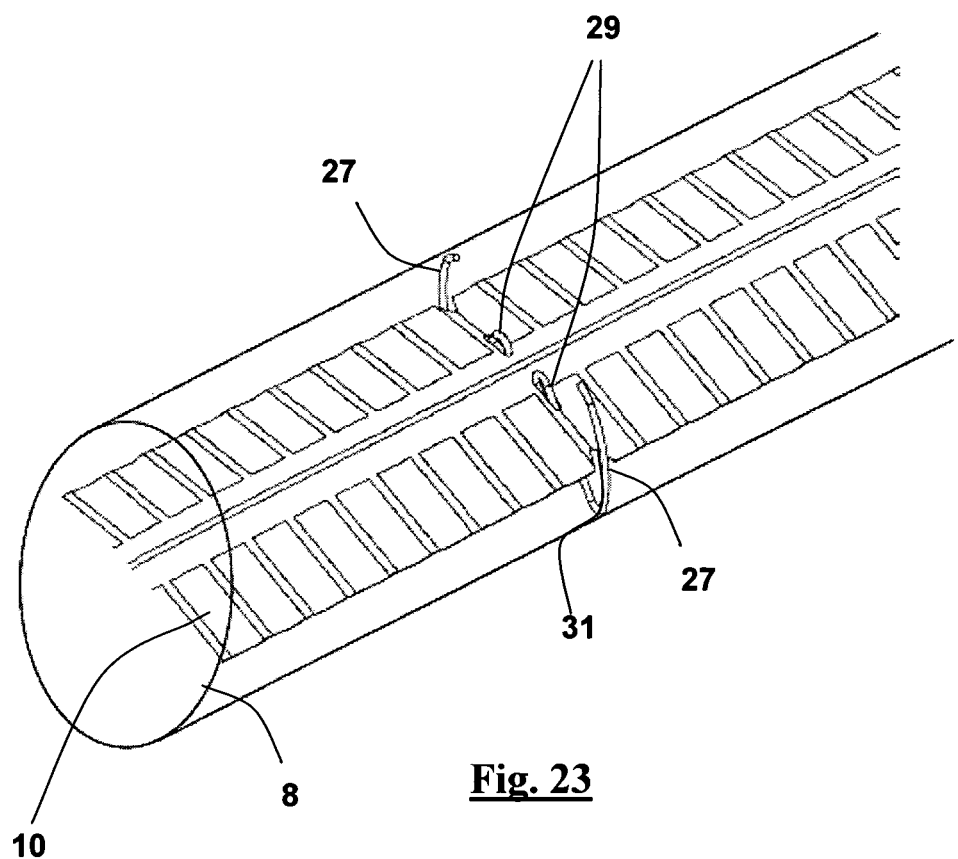
FIG. 23 is an isometric view of part of the assembly of FIG. 19 mounted in a tube.

Referring to FIGS. 16 to 18 the clamping section 26 of the wire-form clip 25 will have a defined separation of y and the side support section 27 will have a defined separation of x.

When the clip engages with the elongate tube 11, 15 the clamping section 26 of the wire-form clip 25 expands to a defined separation of y+a and the side support sections 27 expand to a defined separation of x+b.

When the absorbing section 9 is inserted into the transparent enclosure 8 this serves to compress the side support sections 27 such that the separation in the side support sections 27 reverts to a separation of x. The separation of the clamping section 26 remains at a separation of y+a. This remaining expansion of the clamping section 26 and the compression of the side support sections 27 ensure that a rigid support clip structure is provided to support the absorbing section 9 concentrically within the transparent enclosure 8.

Although the separation of the clamping section remains at a separation of y+a the compression of the side support sections 27 causes an increased force to be applied by the clamping section 26 onto the elongate tube 11, 15 to which the clamping section 26 of the wire-form clip 25 is attached. This increased force/interference, in combination with the support lugs 29 protruding through the absorbing plate occlusions 30, ensures that the wire form clip remains in a perpendicular position in relation to the absorbing section 9 during assembly and operation.

The inner arcuate clamping portions 26 define an open mouth for engagement with the outer surface of the working fluid tube 11, 15. The width of the mouth is less than the outer diameter of the working fluid tube. The clip sections that define the support lugs 29 project upwardly and are shaped to define a lead-in to the open mouth defined by the clamping portions 26. The projections 29 extend into and engage in the absorber plate occlusions 30 which ensures that the clip remains centrally located in the solar absorber tube 1. The single piece wire clip 25 is flat. It lies in use in a single plane transverse to the longitudinal axis of the solar absorbing tube. The single piece wire clip is symmetrical about an axis through the centre of the working fluid hole to which it is clamped.

FIGS. 19 to 23 show a preferred embodiment of the absorbing plate 10 with a plurality of longitudinally spaced-apart wire-form clips 25 attached. The absorbing plate 10 of the solar absorbing tube 1 will generally require one or more wire-form clips 25 to ensure the absorbing section 9 is retained securely in a central position within the radiation transparent enclosure 8 throughout the lifetime of the product.

The wire-form clip 25 is completely symmetrical thereby enabling the wire-form clip 25 of the invention to be readily used in automated manufacturing processes. The symmetrical nature of the wire-form clip 25 of the invention allows for the automated assembly of the wire-form clip 25 onto the elongate tube 11, 15 and through the absorber plate 10 utilising equipment to insert from only one side of the absorbing section 9. The wire-form clip 25 of the invention also has added rigidity due to the manner in which the side support sections 27 engage positively with the inner surface of the radiation transparent enclosure 8. Additional structural rigidity and support is provided in the longitudinal axis by the support lugs 29 that protrude through the absorbing plate occlusions.

Figure 24:
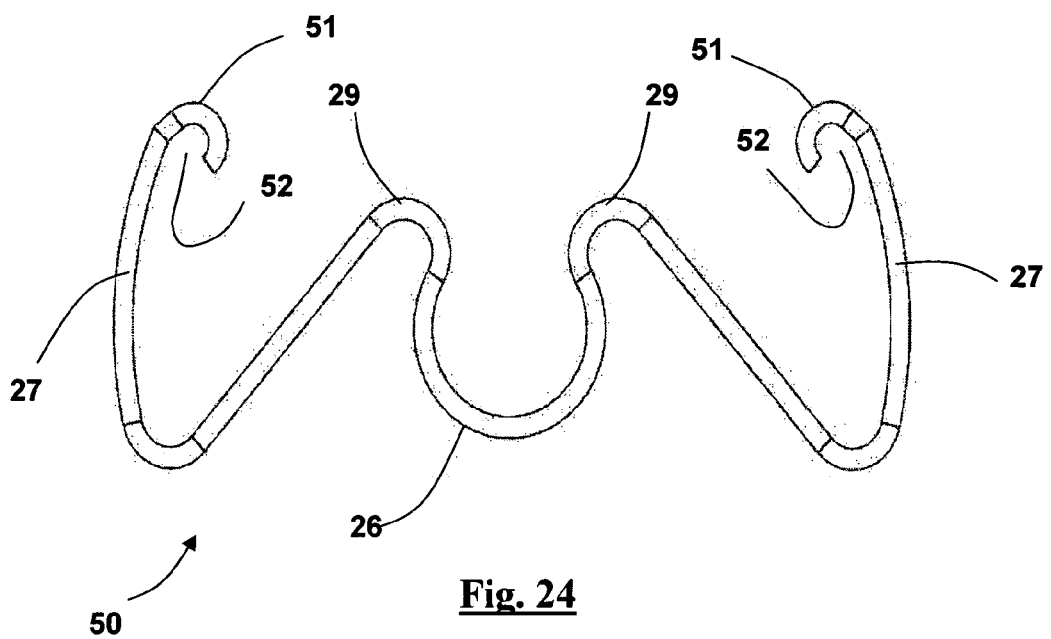
FIG. 24 is a cross sectional view of another wire form clip of the invention.

Referring to FIG. 24 there is illustrated another wire form clip 50 according to the invention which is similar to the clip described above and like parts are assigned the same reference numerals. In this case the free ends of the clip are formed with inwardly curved tags 51 which define recesses 52 which may be used to accommodate rods (not shown) on which the clip 50 is mounted for assembly. The carrier rods can be used to squeeze the free ends of the clip 50 inwardly during insertion of the clip into the radiation absorbing glass tube to prevent contact between those sections of the clip 50 and the glass tube and thereby prevent any risk of scratching of the glass during insertion. Such a system also facilitates automation of the clip insertion step.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

The invention is not limited to the embodiment hereinbefore described, with reference to the accompanying drawings, which may be varied in construction and detail.

The invention claimed is:
1. A solar collector comprising
an evacuated radiation transparent solar absorbing tube, an absorbing section comprising a radiation absorbing plate, an elongate tube for a working fluid in contact with the radiation absorbing plate, and a retaining means for retaining the absorbing plate in position in the solar absorbing tube, wherein the retaining means retains the absorbing section in a central position within the evacuated radiation transparent solar absorbing tube and wherein the retaining means comprises:

a single piece wire clip having a clamping portion extending partially around and clamping onto an outer surface of the working fluid tube and, a pair of resilient side support sections flanking the clamping portion and connected to the clamping portion by arcuate connecting sections, the side support sections extending so that portions thereof engage against an inner surface of the solar absorbing tube and wherein the side support sections and arcuate connecting sections extend through openings in the surface of the radiation absorbing plate.

2. The solar collector as claimed in claim 1 wherein the single piece wire clip lies in a single plane transverse to the longitudinal axis of the solar absorbing tube.

3. The solar collector as claimed in claim 1 wherein the single piece wire clip is symmetrical about an axis through the center of the working fluid tube.

4. The solar collector as claimed in claim 1 wherein the side support sections each terminate in a free end portion.

5. The solar collector as claimed in claim 4 wherein the free end portions are in-turned.

6. The solar collector as claimed in claim 1 wherein the inner clamping portion is of generally arcuate form extending partially around the working fluid tube, the radius of the clamping portion being at most approximately equal to an outer radius of the working fluid tube.

7. The solar collector as claimed in claim 6 wherein the inner clamping portion has an open mouth for engagement with the outer surface of the working fluid tube.

8. The solar collector as claimed in claim 7 wherein the width of the mouth is less than the outer diameter of the working fluid tube.

9. The solar collector as claimed in claim 1 wherein the side support sections are of generally arcuate form.

10. The solar collector as claimed in claim 1 wherein the wire form is of generally circular cross section.

11. The solar collector as claimed in claim 1 wherein the side support sections of the clip extend through the opening in the surface of the radiation absorbing plate without contacting the plate.

12. The solar collector as claimed in claim 1 wherein the arcuate connecting sections engage with the absorbing plate.

* * * * *